(12) United States Patent
Tran et al.

(10) Patent No.: US 11,086,539 B2
(45) Date of Patent: Aug. 10, 2021

(54) MAPPING CONSECUTIVE LOGICAL BLOCK ADDRESSES TO CONSECUTIVE GOOD BLOCKS IN MEMORY DEVICE

(71) Applicant: SanDisk Technologies LLC, Addison, TX (US)

(72) Inventors: Dat Tran, San Jose, CA (US); Loc Tu, San Jose, CA (US); Kirubakaran Periyannan, Santa Clara, CA (US)

(73) Assignee: SanDisk Technologies LLC, Addison, TX (US)

( * ) Notice: Subject to any disclaimer, the term of this patent is extended or adjusted under 35 U.S.C. 154(b) by 117 days.

(21) Appl. No.: 16/659,353

(22) Filed: Oct. 21, 2019

(65) Prior Publication Data
US 2021/0117086 A1    Apr. 22, 2021

(51) Int. Cl.
*G06F 3/06* (2006.01)

(52) U.S. Cl.
CPC ............ *G06F 3/064* (2013.01); *G06F 3/0619* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,621,139 B2 | 12/2013 | Chu | |
| 8,705,299 B2 * | 4/2014 | Sarin | G11C 29/82 365/200 |
| 9,128,822 B2 | 9/2015 | Michael et al. | |
| 9,286,176 B1 | 3/2016 | Tomlin et al. | |
| 9,460,815 B2 | 10/2016 | Sivasankaran et al. | |
| 2008/0235939 A1 | 10/2008 | Hiew et al. | |
| 2009/0013148 A1 * | 1/2009 | Eggleston | G06F 3/0688 711/203 |
| 2017/0278821 A1 | 9/2017 | Zhao et al. | |

\* cited by examiner

*Primary Examiner* — Ryan Bertram
*Assistant Examiner* — Edmund H Kwong
(74) *Attorney, Agent, or Firm* — Vierra Magen Marcus LLP

(57) ABSTRACT

Consecutive logical block addresses (LBAs) are mapped to consecutive good blocks in a sequence of blocks in a memory device. For each bad block, a mapping process substitutes a next available good block. For a selected LBA, the mapping process determines a number X>1 of bad blocks before, and including, a corresponding block in the sequence, a number Y of bad blocks in the X blocks after the corresponding block in the sequence, and maps the LBA to a block which is X+Y blocks after the corresponding block, or, if the block which is X+Y blocks after the corresponding block is a bad block, to a next good block. The mapping technique can be used for a sequence of blocks in a trimmed die, where a bad block register stores physical block addresses of the trimmed away blocks.

18 Claims, 12 Drawing Sheets

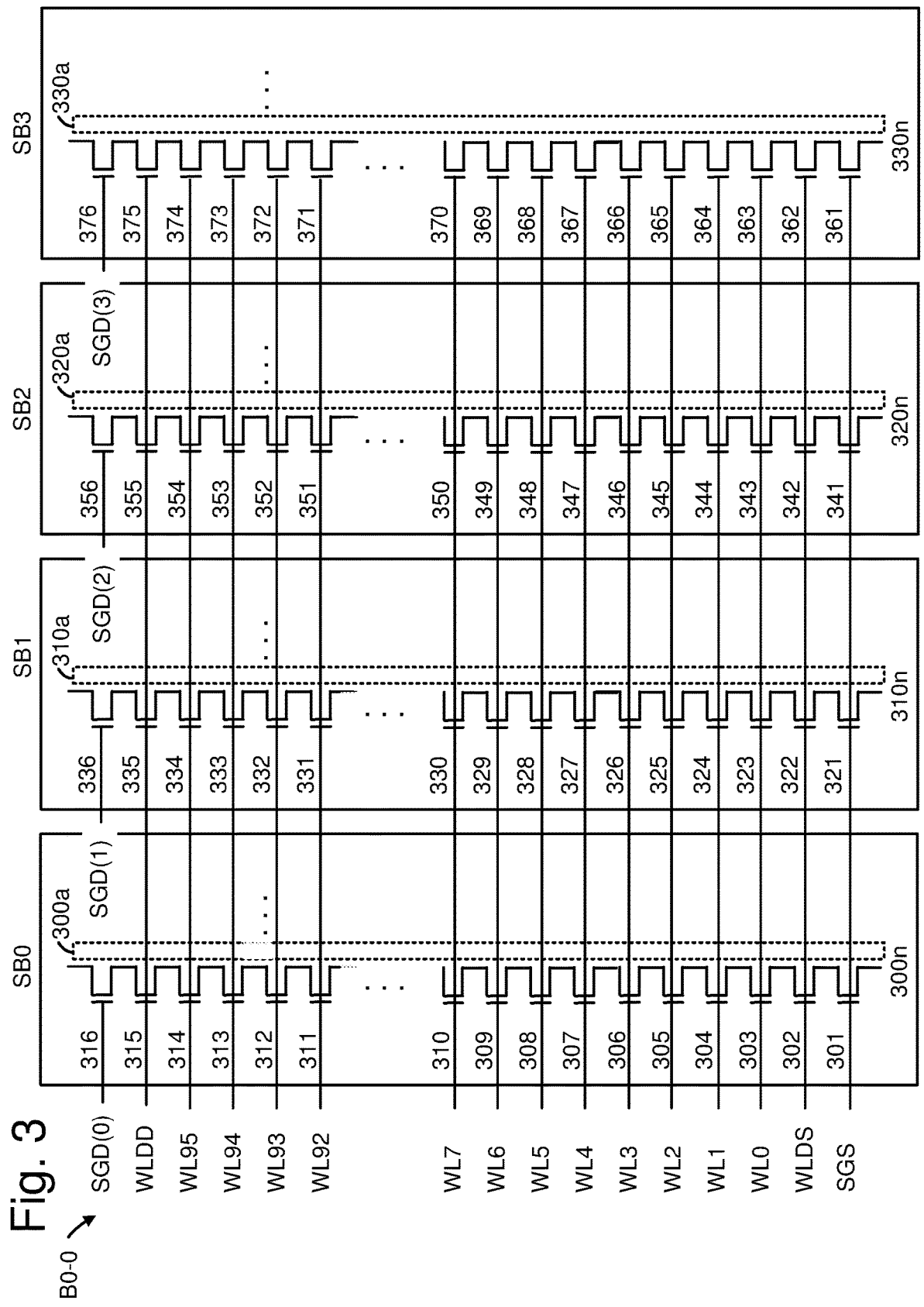

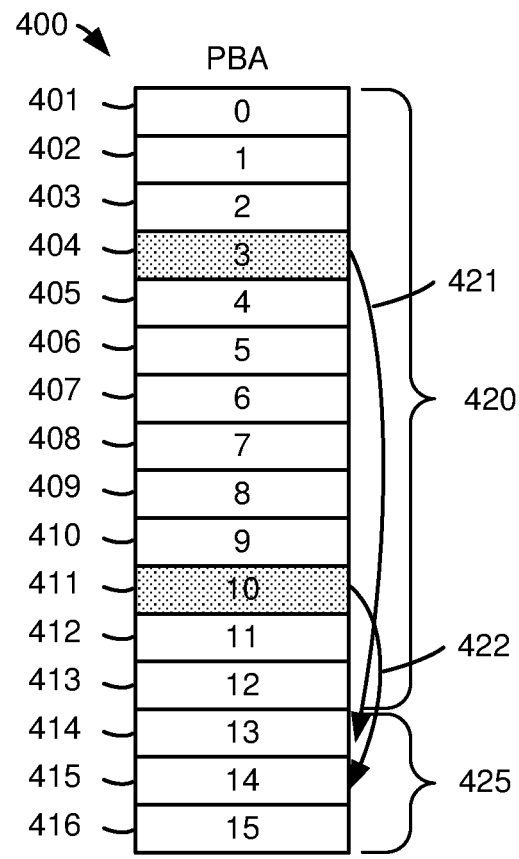

Register for bad blocks
8
13
16
19
21

| LBA | PBA |
|---|---|
| 0 | 0 |
| 2 | 2 |
| 4 | 4 |
| 6 | 6 |
| 8 | 10 |
| 10 | 12 |
| 12 | 14 |
| 14 | 18 |
| 16 | 20 |
| 18 | 22 |
| 20 | 24 |
| 22 | 26 |
| 24 | 28 |

| LBA | PBA |
|---|---|
| 1 | 1 |
| 3 | 3 |
| 5 | 5 |
| 7 | 7 |
| 9 | 9 |
| 11 | 11 |
| 13 | 15 |
| 15 | 17 |
| 17 | 23 |
| 19 | 25 |
| 21 | 27 |
| 23 | 29 |
| 25 | 31 |

Fig. 11A
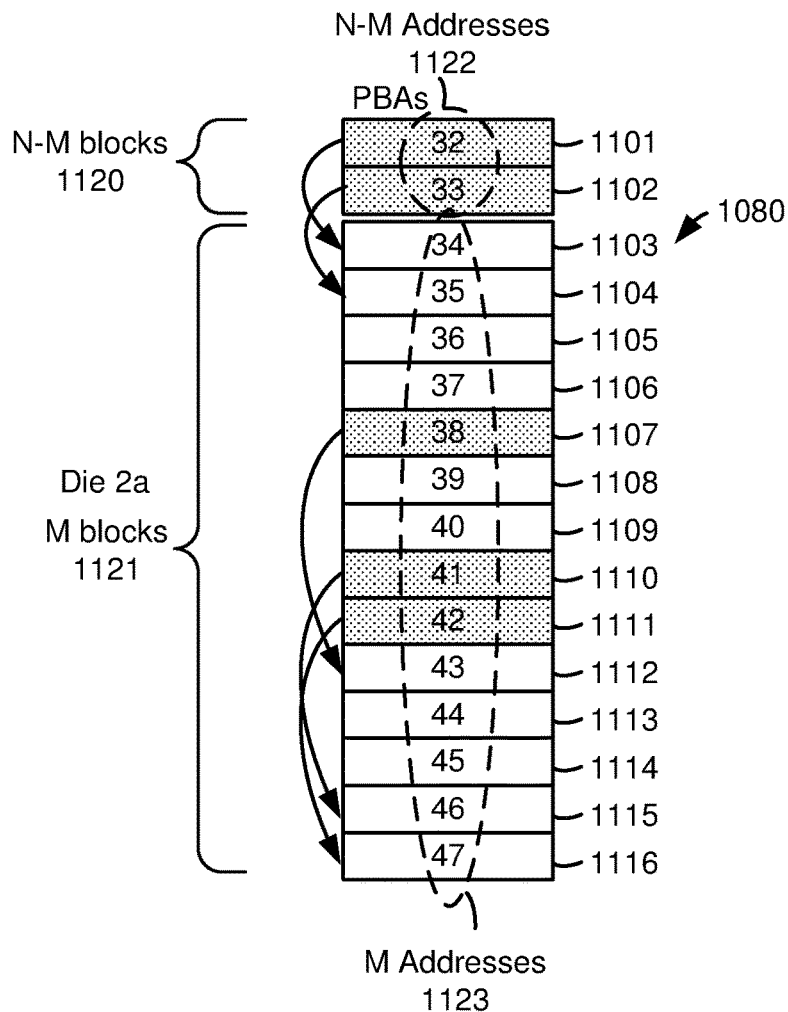
Fig. 11B
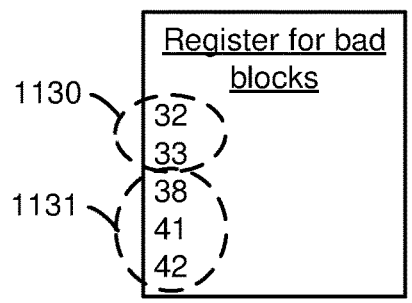
Fig. 11C
| LBA | PBA |
|-----|-----|
| 32 | 34 |
| 33 | 35 |
| 34 | 36 |
| 35 | 37 |
| 36 | 39 |
| 37 | 40 |
| 38 | 43 |
| 39 | 44 |
| 40 | 45 |
| 41 | 46 |
| 42 | 47 |

US 11,086,539 B2

MAPPING CONSECUTIVE LOGICAL BLOCK ADDRESSES TO CONSECUTIVE GOOD BLOCKS IN MEMORY DEVICE

BACKGROUND

The present technology relates to the operation of storage and memory devices.

Semiconductor memory devices have become more popular for use in various electronic devices. For example, non-volatile semiconductor memory is used in cellular telephones, digital cameras, personal digital assistants, mobile computing devices, non-mobile computing devices and other devices.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

A memory device includes memory cells which may be arranged in blocks, for instance. However, various challenges are presented in operating such memory devices.

BRIEF DESCRIPTION OF THE DRAWINGS

FIG. 3 depicts an example view of NAND strings in the block B0-0 of FIG. 2.

FIG. 4A depicts an example sequence 400 of blocks and a comparative example of remapping of bad blocks.

FIG. 4B depicts a mapping table consistent with FIG. 4A.

FIG. 4C depicts a correspondence between LBAs and PBAs consistent with FIGS. 4A and 4B.

FIG. 11A depicts the sequence 1080 of blocks in the trimmed die, Die 2a, of FIG. 10B, where consecutive logical block addresses are mapped to consecutive good blocks.

FIG. 11B depicts a register for bad blocks, consistent with FIG. 11A.

FIG. 11C depicts a correspondence between LBAs and PBAs consistent with FIGS. 11A and 11B.

DETAILED DESCRIPTION

Apparatuses and techniques are described for more efficiently mapping logical addresses to blocks in a memory device.

Figure 2:
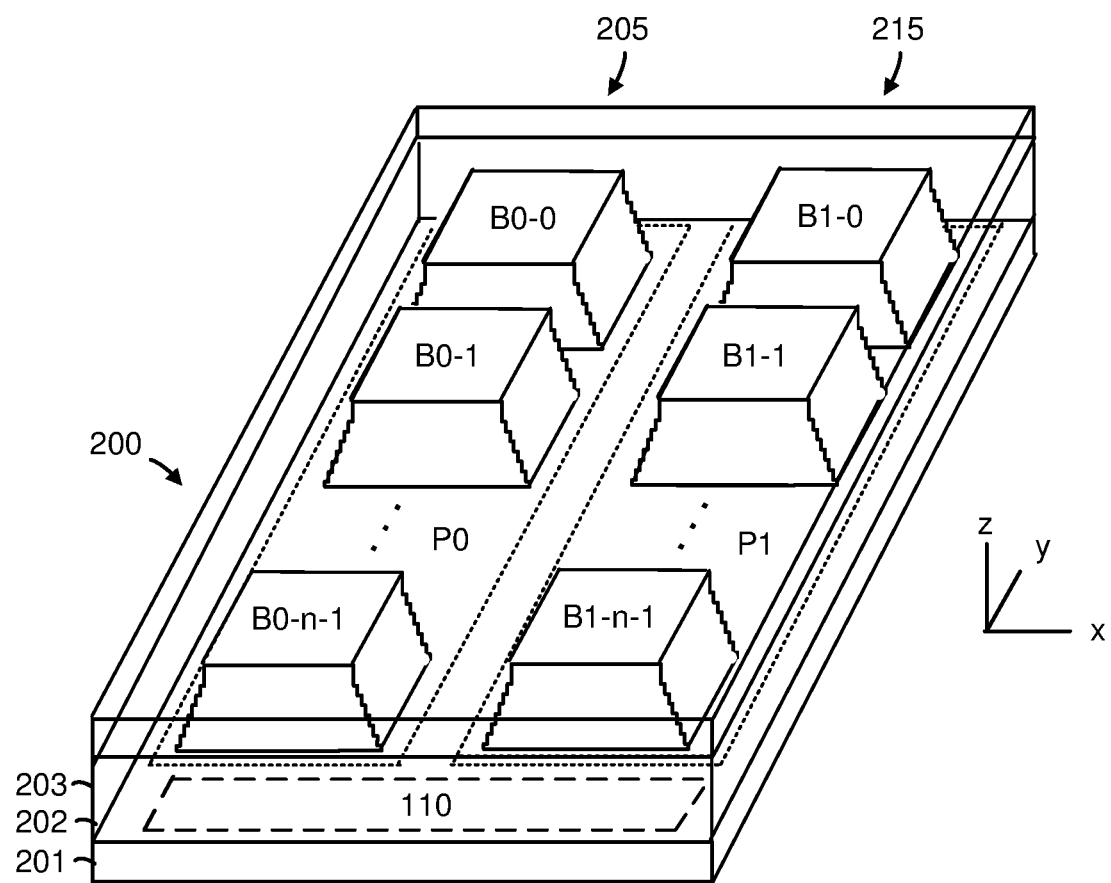
FIG. 2 is a perspective view of an example memory die 200 in which two sequences of blocks are provided in respective planes P0 and P1.

In a memory device, memory cells can be arranged in a sequence of blocks such as depicted in FIG. 2. The memory cells can be joined to one another, e.g., in NAND strings, such as depicted in FIG. 3. Further, the memory cells can be arranged in a 2D or 3D structure. In a 3D memory structure, the memory cells may be arranged in vertical NAND strings in a stack, where the stack comprises alternating conductive and dielectric layers. The conductive layers act as word lines which are connected to the memory cells. Each NAND string may have the shape of a pillar which intersects with the word lines to form the memory cells. In a 2D memory structure, the memory cells may be arranged in horizontal NAND strings on a substrate. The memory cells in a block can be subject to program, read and erase operations.

Circuits for performing operations on the blocks can be arranged on a periphery of a die, where one set of circuits is used for one or more sequences of blocks on the die. For increased parallelism, the sequences of blocks can be arranged in respective planes on a substrate, and operations can be performed in parallel on one block in each plane.

However, defective or bad blocks are sometimes present in a sequence of blocks. Bad blocks can result from short circuits and other defects which occur at the time of manufacture, or due to deterioration, environmental factors or other reasons. The bad blocks can be randomly distributed or have a clustered distribution. To ensure that a memory device has a sufficient storage capacity, substitute blocks can be included in a sequence. For example, FIG. 4A shows a sequence 400 of blocks which includes a subset blocks 420 which are reserved as primary blocks and a subset of blocks 425 which are reserved as substitute blocks. When a bad primary block is detected, a substitute block can be used in its place. The memory device can use a table such as in FIG. 4B or 4C to map a logical block address (LBA) which is received from a host, for example, to a physical block address (PBA) which identifies a substitute block. However, this approach results in consecutive LBAs being mapped to blocks which can be far apart in the sequence of blocks.

This can be problematic during concurrent testing of multiple blocks in multiple planes. For example, it may be desired to concurrently test blocks which are adjacent or nearly adjacent to one another in different planes. This is not possible with the above technique since the host does not know which LBAs have been mapped to substitute blocks. Instead, the host has a file system which uses LBAs to identify data, while the mapping is performed at the memory device.

Techniques provided herein address the above and other issues. In one approach, consecutive LBAs are mapped to consecutive good blocks in a sequence of blocks. A circuit is provided to map consecutive LBAs in a first sequence of LBAs, starting from an initial LBA in the first sequence of LBAs and continuing to a last LBA in the first sequence of LBAs, to consecutive good blocks in a first block sequence, starting from an initial good block in the first block sequence and continuing to a last good block in the first block sequence which is used in the mapping. For each bad block of one or more bad blocks in the first block sequence, the mapping substitutes a next available good block in the first block sequence. The first block sequence may be in a first plane on a substrate.

In an example implementation, a position of each LBA in the first sequence of LBAs corresponds to a position of a block in the first block sequence, and to map a selected LBA in the first sequence of LBAs to a block in the first block sequence, a circuit is configured to: determine a block having a position in the first block sequence corresponding to the position of the selected LBA in the first sequence of LBAs; determine a number X>1 of bad blocks before, and including, the corresponding block in the sequence; determine a number Y of bad blocks in the X blocks after the corresponding block in the sequence; and map the selected LBA to a block which is X+Y blocks after the corresponding block in the first block sequence, or, if the block which is X+Y blocks after the corresponding block is a bad block, to a next good block after the block which is X+Y blocks after the corresponding block.

In another aspect, the mapping technique is used for a sequence of blocks in a trimmed die (See FIG. 10A-10D). To adapt the technique to the trimmed die, a bad block register stores PBAs of the trimmed away blocks.

These and other features are discussed further below.

Figure 1:
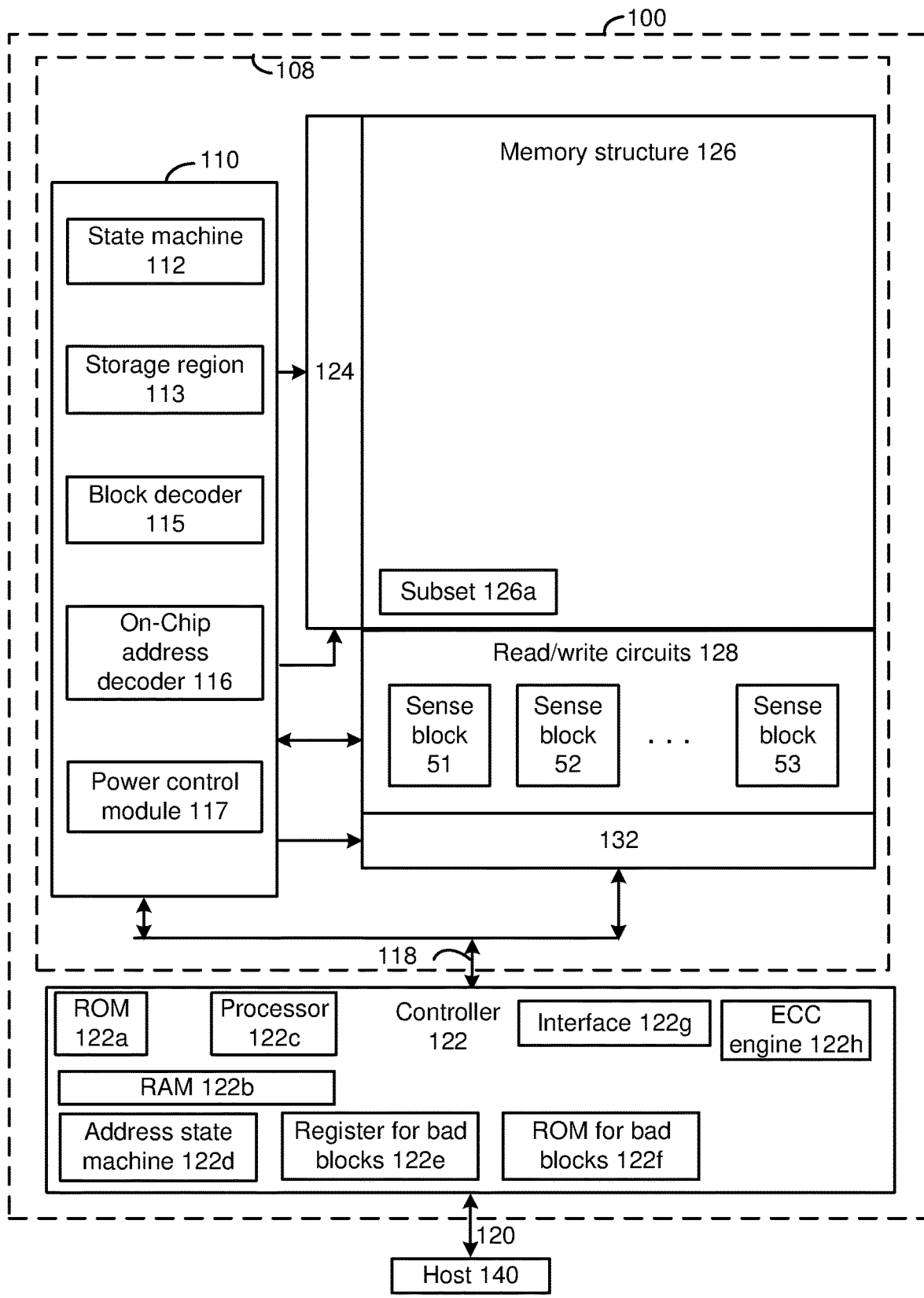
FIG. 1 is a block diagram of an example storage device.

FIG. 1 is a block diagram of an example storage device. The storage device 100, such as a non-volatile storage system, may include one or more memory die 108. The memory die 108, or chip, includes a memory structure 126 of memory cells, such as an array of memory cells, control circuitry 110, and read/write circuits 128. The memory structure 126 could include one or more sequences of blocks in respective planes, for example. See FIG. 2 and the example planes P0 and P1 which includes sequences 205 and 215, respectively, of blocks B0-0 to B0-n-1 and B1-0 to B1-n-1, respectively. Each sequence has a number n blocks. Typically, each plane in the memory structure 126 is addressable by word lines via a row decoder 124 and by bit lines via a column decoder 132.

The read/write circuits 128 include multiple sense blocks 51, 52, . . . 53 (sensing circuitry) and allow a page of memory cells to be read or programmed in parallel. Typically a controller 122 is included in the same storage device 100 (e.g., a removable storage card) as the one or more memory die 108. The controller may be separate from the memory die. Commands and data are transferred between the host 140 and controller 122 via a data bus 120, and between the controller and the one or more memory die 108 via lines 118.

The memory structure can be 2D or 3D. The memory structure may comprise one or more array of memory cells including a 3D array. The memory structure may comprise a monolithic 3D memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

The control circuitry 110 cooperates with the read/write circuits 128 to perform memory operations on the memory structure 126, and includes a state machine, an on-chip address decoder 116 and a power control module 117 (power control circuit). A storage region 113 may be provided, e.g., for operational parameters and software/code. In one embodiment, the state machine is programmable by the software. In other embodiments, the state machine does not use software and is completely implemented in hardware (e.g., electrical circuits).

The on-chip address decoder 116 provides an address interface between that used by the host or a memory controller to the hardware address used by the decoders 124 and 132. The power control module 117 controls the power and voltages supplied to the word lines, select gate lines, bit lines and source lines during memory operations. It can include drivers for word lines, select gate, source (SGS) and select gate, drain (SGD) transistors and source lines.

In some implementations, some of the components can be combined. In various designs, one or more of the components (alone or in combination), other than memory structure 126, can be thought of as at least one control circuit which is configured to perform the techniques described herein including the steps of the processes described herein. For example, a control circuit may include any one of, or a combination of, control circuitry 110, state machine 112, decoders 116 and 132, power control module 117, sense blocks 51, 52, . . . , 53, read/write circuits 128, controller 122, and so forth.

The off-chip controller 122 (which in one embodiment is an electrical circuit) may comprise a processor 122c, and memory such as ROM 122a and RAM 122b. The RAM 122b can be a DRAM, for instance. A copy of data to be programmed is received from the host and stored temporarily in the RAM until the programming is successfully completed to blocks in the memory device. The RAM may store one or more word lines of data.

A ROM for bad blocks 122f may store PBAs of bad blocks. The PBAs can be loaded from the ROM for bad blocks 122f to the register for bad blocks 122e upon power up of the memory device. In this example, the ROM for bad blocks is in the controller 122. In another example, the ROM for bad blocks is a block in the memory structure 126. An address state machine 122d can access the register 122e to map input LBAs received from the host to physical blocks such as by using their PBAs. The mapping process of the address state machine is described in further detail below.

An error-correction code (ECC) engine 122h can be used to correct a number of read errors. A memory interface 122g, in communication with ROM 122a, RAM 122b and processor 122c, is an electrical circuit that provides an electrical interface between the controller and one or more memory die. For example, the memory interface can change the format or timing of signals, provide a buffer, isolate from surges, latch I/O and so forth. The processor can issue commands to the control circuitry 110 (or any other component of the memory die) via the memory interface 122g.

The memory in the controller 122, such as such as ROM 122a and RAM 122b, comprises code such as a set of instructions, and the processor is operable to execute the set of instructions to provide the functionality described herein. Alternatively or additionally, the processor can access code from a subset 126a of the memory structure 126, such as a reserved area of memory cells in one or more word lines.

For example, code can be used by the controller to access the memory structure such as for programming, read and erase operations. The code can include boot code and control code (e.g., a set of instructions). The boot code is software that initializes the controller during a booting or startup process and enables the controller to access the memory structure. The code can be used by the controller to control one or more memory structures. Upon being powered up, the processor 122c fetches the boot code from the ROM 122a or the subset 126a of the memory structure for execution, and the boot code initializes the system components and loads the control code into the RAM 122b. Once the control code is loaded into the RAM, it is executed by the processor. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below, and provide the voltage waveforms including those discussed further below. A control circuit can be configured to execute the instructions to perform the functions described herein.

In one embodiment, the host is a computing device (e.g., laptop, desktop, smartphone, tablet, digital camera) that includes one or more processors, one or more processor readable memory devices (RAM, ROM, flash memory, hard disk drive, solid-state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory (DRAM) or static random access memory (SRAM) devices, non-volatile memory devices, such as resistive random access memory (ReRAM), electrically erasable programmable read-only memory (EEPROM), flash memory (which can also be considered a subset of EEPROM), ferroelectric random access memory (FRAM), and magnetoresistive random access memory (MRAM), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a 2D memory structure or a 3D memory structure.

In a 2D memory structure, the semiconductor memory elements are arranged in a single plane or a single memory device level. Typically, in a 2D memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A 3D memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements. The columns may be arranged in a 2D configuration, e.g., in an x-y plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

2D arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this technology is not limited to the 2D and 3D exemplary structures described but covers all relevant memory structures within the spirit and scope of the technology as described herein and as understood by one of skill in the art.

FIG. 2 is a perspective view of an example memory die 200 in which two sequences of blocks are provided in respective planes P0 and P1. The memory die includes a substrate 201, an intermediate region 202 in which blocks of memory cells are formed, and an upper region 203 in which one or more upper metal layers are patterned such as to form bit lines. Planes P0 and P1 represent respective isolated regions which are formed in the substrate 201. Further, a first block sequence 205 of a number n blocks, labelled B0-0 to B0-$n$-1, are formed in P0, and a second block sequence 215 of a number n blocks, labelled B1-0 to B1-$n$-1, are formed in P1. Each plane may have associated row and column control circuitry, such as the row decoder 124, read/write circuits 128 and column decoder 132 of FIG. 1. The control circuitry 110, which may be located in a peripheral area of the die, may be shared among the planes, in one approach. Each plane may have a separate set of bit lines.

By providing blocks of memory cells in multiple planes, parallel operations can be performed in the planes.

The substrate 201 can also carry circuitry under the blocks, and one or more lower metal layers which are patterned in conductive paths to carry signals of the circuitry.

In this example, the memory cells are formed in vertical NAND strings in the blocks. Each block comprises a stacked area of memory cells, where alternating levels of the stack represent word lines. In one possible approach, each block has opposing tiered sides from which vertical contacts extend upward to an upper metal layer to form connections to conductive paths. While two planes are depicted as an example, other examples can use four or more planes. One plane per die is also possible. As mentioned, parallel operations can be performed on one block in each plane.

While the above example is directed to a 3D memory device with vertically extending NAND strings, the techniques provided herein are also applicable to a 2D memory device in which the NAND strings extend horizontally on a substrate.

FIG. 3 depicts an example view of NAND strings in the block B0-0 of FIG. 2. The NAND strings are arranged in sub-blocks of the block in a 3D configuration. Each sub-block includes multiple NAND strings, where one example NAND string is depicted. For example, SB0, SB1, SB2 and SB3 comprise example NAND strings 300$n$, 310$n$, 320$n$ and 330$n$, respectively. The NAND strings have data word lines, dummy word lines and select gate lines. Each sub-block comprises a set of NAND strings which extend in the x direction and which have a common SGD line or control gate layer. The NAND strings 300$n$, 310$n$, 320$n$ and 330$n$ are in sub-blocks SB0, SB1, SB2 and SB3, respectively. Programming of the block may occur based on a word line programming order. One option is to program the memory cells in different portions of a word line which are in the different sub-blocks, one sub-block at a time, before programming the memory cells of the next word line. For example, this can involve programming WL0 in SB0, SB1, SB2 and then SB2, then programming WL1 in SB0, SB1, SB2 and then SB2, and so forth. The word line programming order may start at WL0, the source-end word line and end at WL95, the drain-end word line, for example.

The NAND strings 300$n$, 310$n$, 320$n$ and 330$n$ have channels 300$a$, 310$a$, 320$a$ and 330$a$, respectively. Additionally, NAND string 300$n$ includes SGS transistor 301, dummy memory cell 302, data memory cells 303-314, dummy memory cell 315 and SGD transistor 316. NAND string 310$n$ includes SGS transistor 321, dummy memory cell 322, data memory cells 323-334, dummy memory cell 335 and SGD transistor 336. NAND string 320$n$ includes SGS transistor 341, dummy memory cell 342, data memory cells 343-354, dummy memory cell 355 and SGD transistor 356. NAND string 330$n$ includes SGS transistor 361, dummy memory cell 362, data memory cells 363-374, dummy memory cell 375 and SGD transistor 376.

This example depicts one SGD transistor at the drain-end of each NAND string, and one SGS transistor at the source-end of each NAND string. The SGD transistors in SB0, SB1, SB2 and SB3 may be driven by separate control lines SGD(0), SGD(1), SGD(2) and SGD(3), respectively, in one approach. In another approach, multiple SGD and/or SGS transistors can be provided in a NAND string.

FIG. 4A depicts an example sequence 400 of blocks and a comparative example of remapping of bad blocks. The example sequence includes sixteen blocks 401-416 having physical block addresses (PBAs), or other addresses or identifiers, 0-15, respectively. This is a simplified example since, in practice, a much larger number of blocks such as 4,096 blocks may be provided in a sequence. The sequence of blocks, or block sequence, may be arranged in one plane and extend in a straight line, for instance, from the initial or first block with PBA=0 to the last block, with PBA=15. In some cases, fewer than all blocks in the sequence are used in the mapping. In this example, block 413 with PBA=12 is the last good block in the sequence 400 which is used in the mapping. The shaded blocks 3 and 10 represent bad blocks. The sequence of blocks may include a subset of blocks 420 which are reserved as primary blocks and a subset of blocks 425 which are reserved as substitute blocks. The substitute blocks can be used in place of bad blocks among the primary blocks. For example, bad block 3 is replaced by substitute block 13 (see arrow 421) and bad block 10 is replaced by substitute block 14 (see arrow 422). The substitute block 15 is not used in this example.

A host can access a block using a LBA. In one approach, each LBA has a relative position in a sequence of LBAs and is mapped to a corresponding block which has the same relative position in a sequence or set of blocks. For example, a first LBA (LBA=0) in a set of 13 LBAs (ranging from LBA=0 to LBA=12) is mapped to a corresponding first block 401 with PBA=0 in the sequence 400, assuming the corresponding block is a good block (e.g., not a bad block). If the corresponding block of an LBA is a bad block, the LBA is mapped to a substitute block. For example, LBA=3 is mapped to PBA=13 (block 414) and LBA=10 is mapped to PBA=14 (block 415).

For the remaining LBAs, LBA=1 and LBA=2 are mapped to PBA=1 (block 402) and PBA=2 (block 403), respectively. LBA=4 to LBA=9 are mapped to PBA=4 to PBA=9, respectively (blocks 405-410, respectively). LBA=11 and LBA=12 are mapped to PBA=11 (block 412) and PBA=12 (block 413), respectively.

FIG. 4B depicts a mapping table consistent with FIG. 4A. The table includes a first column which identifies an LBA whose position in a sequence of LBAs corresponds to a position of a bad block in the sequence 400. The second column identifies a corresponding substitute block such as by a PBA. For example, LBA=3 and 10 for bad blocks with PBA=3 and 10, respectively, are replaced by substitute blocks 13 and 14, respectively. While this approach is effective, it results in consecutive LBAs being mapped to non-consecutive good blocks in a sequence, as depicted in FIG. 4C. Also, the remapping table has to cross-reference an LBA to a PBA for each bad block, thereby consuming memory. This approach can also result in delays in various scenarios such as when searching for good block pairs comprising adjacent blocks from different planes in a testing process.

FIG. 4C depicts a correspondence between LBAs and PBAs consistent with FIGS. 4A and 4B. The table of FIG. 4C cross references the LBAs to PBAs in a die. The first column denotes the LBAs of 0-12. The second column denotes the PBAs. The PBA changes from 2 to 13, representing non-consecutive good blocks, when the LBA changes from 2 to 3. Also, the PBA changes from 9 to 14, representing non-consecutive good blocks, when the LBA changes from 9 to 10. The techniques described below address this issue by avoiding the mapping of consecutive LBAs to non-consecutive good blocks.

Figures 5A, 5B, 5C:
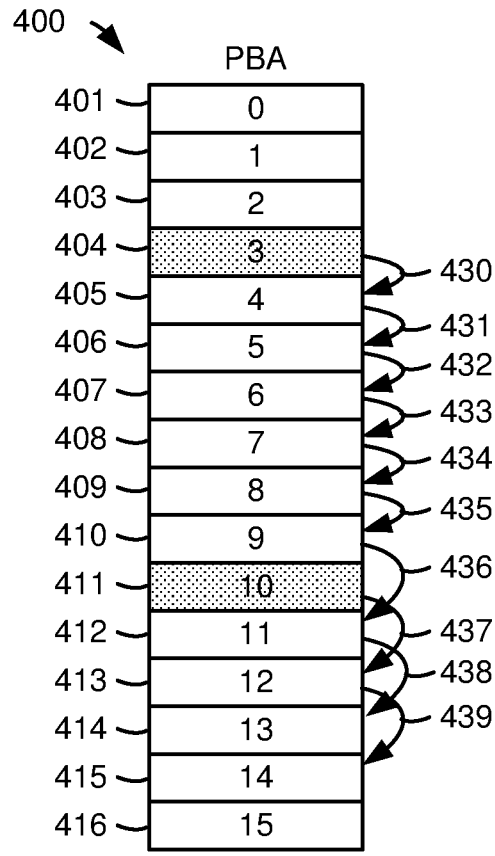
FIG. 5A depicts an example of the sequence 400 of blocks of FIG. 4A, where consecutive logical block addresses are mapped to consecutive good blocks.
FIG. 5B depicts a register of bad blocks consistent with FIG. 5A.
FIG. 5C depicts a correspondence between LBAs and PBAs consistent with FIGS. 5A and 5B.

FIG. 5A depicts an example of the sequence 400 of blocks of FIG. 4A, where consecutive logical block addresses are mapped to consecutive good blocks. The bad blocks are blocks 3 and 10 as in FIG. 4A. However, each bad block is substituted by a next available good block in the sequence 400 rather than by a block in the subset of blocks 425 which are reserved as substitute blocks. With the substitution of FIG. 5A, the LBAs for subsequent good blocks are also remapped to next available good blocks. For a given block, a next available good block may be defined as a block which is not a substitute for another bad block, and which is after the given block in the sequence of blocks.

For example, LBA=0 through LBA=2 are mapped to blocks 401-403, respectively, with PBA=0 to PBA=2, respectively. For the bad block 404 with PBA=3, the corresponding LBA=3 is mapped to block 405 (the next available good block) with PBA=4, as denoted by an arrow 430. The corresponding LBA=4 for block 405 is mapped to block 406 (the next available good block) with PBA=5, as denoted by an arrow 431. Similarly, the corresponding LBA=5 for block 406 is mapped to block 407 (the next available good block) with PBA=6, as denoted by an arrow 432. The corresponding LBA=6 for block 407 is mapped to block 408 (the next available good block) with PBA=7, as denoted by an arrow 433. The corresponding LBA=7 for block 408 is mapped to block 409 (the next available good block) with PBA=8, as denoted by an arrow 434. The corresponding LBA=8 for block 409 is mapped to block 410 (the next available good block) with PBA=9, as denoted by an arrow 435.

The corresponding LBA=9 for block 410 is mapped to block 412 (the next available good block) with PBA=11, as denoted by an arrow 436. Note that block 411 with PBA=10 is not a next available good block for block 410 since block 411 is a bad block.

The corresponding LBA=10 for bad block 411 is mapped to block 413 (the next available good block) with PBA=12, as denoted by an arrow 437. Note that block 412 with PBA=11 is not a next available good block for block 411 since, although block 412 is a good block, it is not available as a substitute. That is, block 412 is used as a substitute block for another block (block 410) which is earlier in the sequence than block 411.

The corresponding LBA=11 for block 412 is mapped to block 414 (the next available good block) with PBA=13, as denoted by an arrow 438. Note that block 413 with PBA=12 is not a next available good block for block 412 since, although block 413 is a good block, it is used as a substitute block for another block (block 411) earlier in the sequence.

The corresponding LBA=12 for block 413 is mapped to block 415 (the next available good block) with PBA=14, as denoted by an arrow 439. Note that block 414 with PBA=13 is not a next available good block for block 413 since although block 414 is a good block, it is used as a substitute block for another block (block 412) earlier in the sequence.

In this approach, consecutive LBAs of LBA=0 to LBA=12 are mapped to consecutive good blocks with PBA=0 to PBA=2, PBA=4 to PBA=9, and PBA=11 to PBA=14.

In FIG. 5A, an initial good block in a first block sequence is block 401 and a last good block in the first block sequence which is used in the mapping is block 415. The block 416 is an extra block which is not used in the mapping. In this example, there are 13 LBAs and the sequence of 16 blocks has the capability to handle three bad blocks.

FIG. 5B depicts a register of bad blocks consistent with FIG. 5A. The register identifies the bad blocks with PBA=3 and 10. These are the fourth and eleventh blocks in the sequence 400 of blocks. The register advantageously need not list the LBAs, in one approach.

FIG. 5C depicts a correspondence between LBAs and PBAs consistent with FIGS. 5A and 5B. The first column denotes the LBAs of 0-12 and the second column denotes the PBAs to which the LBAs are mapped. Each row identifies an LBA and a PBA to which the LBA is mapped. The PBA change from 2 to 4 represents consecutive good blocks, when the LBA changes from 2 to 3. Also, the PBA change from 9 to 11 represents consecutive good blocks, when the LBA changes from 8 to 9. Accordingly, consecutive LBAs are mapped to consecutive good blocks in a sequence of blocks. In one approach, the memory device can be configured with a mapping table which identifies a block for each LBA. While this approach is effective, it consumes memory. Another approach, described further below, involves calculating a block address for a given LBA which is received from a host, for instance. The register of FIG. 5B can be used for this purpose. See FIG. 9D in particular.

FIG. 5A-5C can be implemented by a first set of blocks arranged in a first block sequence 400 in a first plane on a substrate, where each block in the first set of blocks comprises memory cells, and a circuit is configured to map consecutive logical block addresses (LBA=0 to 12) in a first sequence of logical block addresses 450, starting from a first logical block address (LBA=0) in the first sequence of logical block addresses and continuing to a last logical block address (LBA=12) in the first sequence of logical block addresses, to consecutive good blocks in the first block sequence, starting from an initial good block (401) in the first block sequence and continuing to a last good block (415) in the first block sequence which is used in the mapping, wherein for each bad block of one or more bad blocks (404, 410) in the first block sequence, the mapping substitutes a next available good block (405, 412) in the first block sequence.

Figures 6A, 6B, 6C, 6D:
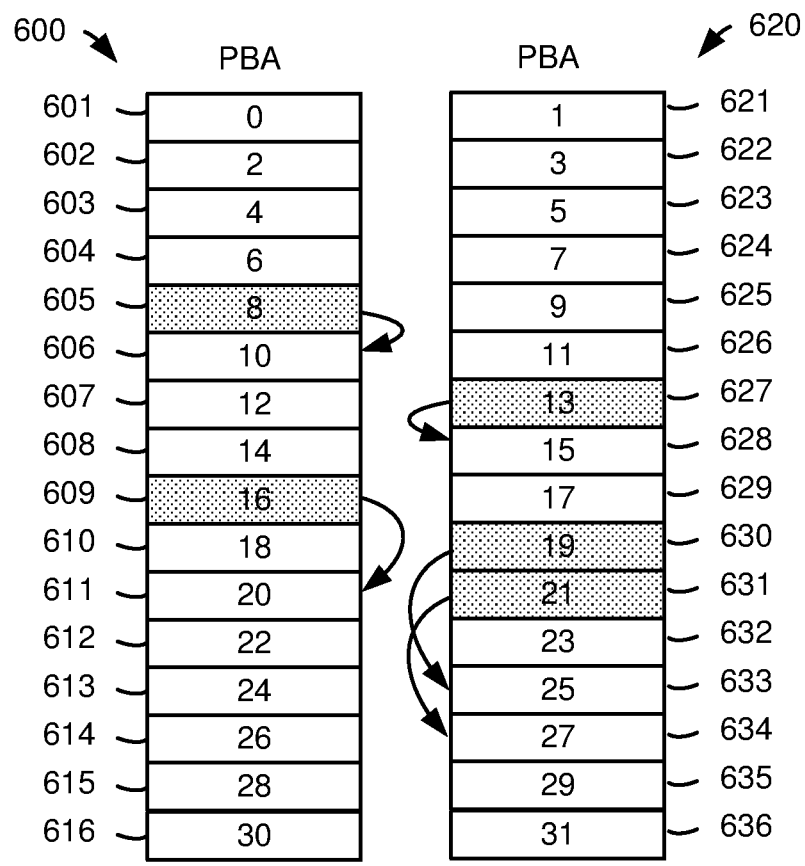
FIG. 6A depicts example sequences 600 and 620 of blocks in a plane, where consecutive logical block addresses are mapped to consecutive good blocks in each plane.
FIG. 6B depicts a register of bad blocks consistent with FIG. 6A.
FIG. 6C depicts a correspondence between LBAs and PBAs consistent with the sequence 600 in FIG. 6A and with FIG. 6B.
FIG. 6D depicts a correspondence between LBAs and PBAs consistent with the sequence 620 in FIG. 6A and with FIG. 6B.

FIG. 6A depicts example sequences 600 and 620 of blocks in a plane, where consecutive logical block addresses are mapped to consecutive good blocks in each plane. The sequences may be in respective planes P0 and P1, for example. The sequences 600 and 620 include blocks 601-616 and 621-636, respectively. Additionally, the sequence 600 includes bad blocks 605 and 609, and the sequence 620 includes bad blocks 627, 630 and 631. The PBAs for the sequence 600 include even-numbered PBAs ranging from 0 to 30, and the PBAs for the sequence 620 include odd-numbered PBAs ranging from 1 to 31. The LBAs for the sequence 600 is a first sequence of LBAs comprising even-numbered logical block addresses (0, 2, . . . ), and the LBAs for the sequence 620 is a second sequence of LBAs comprising odd-numbered logical block addresses (1, 3, . . . ) interleaved with the even-numbered logical block addresses.

FIG. 6B depicts a register of bad blocks consistent with FIG. 6A. The register identifies the bad blocks with PBA=8, 13, 16, 19 and 21. In this example, one bad block register is provided for multiple planes on a die.

FIG. 6C depicts a correspondence between LBAs and PBAs consistent with the sequence 600 in FIG. 6A and with FIG. 6B. The first column denotes the even-numbered LBAs ranging from 0-24 and the second column denotes the PBAs to which the LBAs are mapped. The LBAs of 0, 2, 4 and 6 are mapped to blocks with like-numbered PBAs. Since PBA=8 is a bad block, the LBAs of 8, 10 and 12 are mapped to PBAs of 10, 12 and 14, respectively. Since PBA=16 is a bad block, the LBAs of 14, 16, 18, 20, 22 and 24 are mapped to PBAs of 18, 20, 22, 24, 26 and 28, respectively. The bad blocks 605 and 609 are substituted by the blocks 606 and 611, respectively, as shown by the associated curved arrows in FIG. 6A. These are examples of next available good blocks which substitute for the bad blocks.

FIG. 6D depicts a correspondence between LBAs and PBAs consistent with the sequence 620 in FIG. 6A and with FIG. 6B. The first column denotes the odd-numbered LBAs ranging from 1-25 and the second column denotes the PBAs to which the LBAs are mapped. The LBAs of 1, 3, 5, 7, 9 and 11 are mapped to blocks with like-numbered PBAs. Since PBA=13 is a bad block, the LBAs of 13 and 15 are mapped to PBAs of 15 and 17, respectively. Since PBA=19 and 21 are bad blocks, the LBAs of 17, 19, 21, 23 and 25 are mapped to PBAs of 23, 25, 27, 29 and 31, respectively. The bad blocks 627, 630 and 631 are substituted by the blocks 628, 633 and 634, respectively, as shown by the associated curved arrows in FIG. 6A. These are examples of next available good blocks which substitute for the bad blocks.

Figure 7:
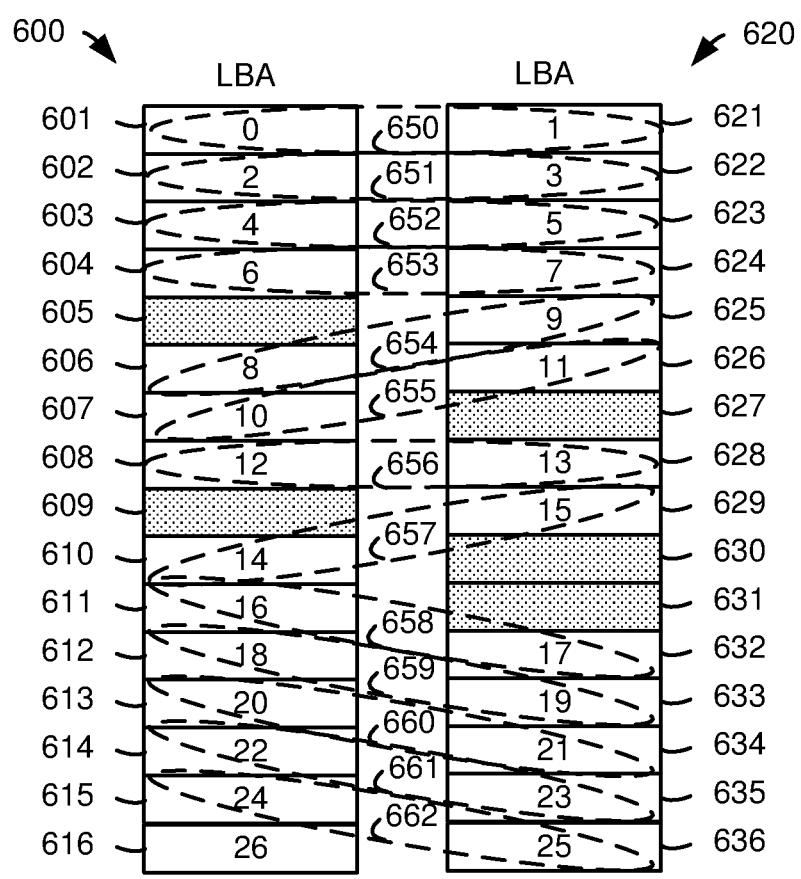
FIG. 7 depicts the example sequences 600 and 620 of blocks of FIG. 6A, where pairs of adjacent or nearly-adjacent blocks are associated with pairs of consecutive LBAs.

FIG. 7 depicts the example sequences 600 and 620 of blocks of FIG. 6A, where pairs of adjacent or nearly-adjacent blocks are associated with pairs of consecutive LBAs. The LBA which is mapped to each block is depicted, consistent with FIGS. 6C and 6D. The dashed line ovals depict groups 650-662 (e.g., pairs) of two blocks comprising one block from each sequence or plane on a die. A pair of consecutive LBAs is mapped to a pair of blocks in each group. For example, the group 650 includes blocks 601 and 621 which are mapped to by consecutive LBAs of 0 and 1, respectively. Similarly, the group 651 includes blocks 602 and 622 which are mapped to by consecutive LBAs of 2 and 3, respectively. The group 652 includes blocks 603 and 623 which are mapped to by consecutive LBAs of 4 and 5, respectively. The group 653 includes blocks 604 and 624 which are mapped to by consecutive LBAs of 6 and 7, respectively. Moreover, in the above groups, the blocks in each group are adjacent to one another on a die. That is, the blocks of each group have a same relative position in their respective sequences. For example, in the group 650, blocks 601 and 621 are the first blocks in the sequences 600 and 620, respectively, in the group 651, blocks 602 and 622 are the second blocks in the sequences 600 and 620, respectively, and so forth.

Due to the bad block 605, a group 654 includes blocks 606 and 625, which are mapped to by consecutive LBAs of 8 and 9, respectively. Similarly, a group 655 includes blocks 607 and 626 which are mapped to by consecutive LBAs of 10 and 11, respectively. In each group, the blocks are offset by one block in the respective planes. The blocks in each of the groups 654 and 655 are nearly adjacent since they are offset by no more than a few blocks.

Due to the bad block 627, a group 656 includes blocks 608 and 628, which are mapped to by consecutive LBAs of 12 and 13, respectively. The blocks in the group are adjacent to one another again.

Due to the bad block 609, a next group 657 includes blocks 610 and 629, which are mapped to by consecutive LBAs of 14 and 15, respectively. The blocks in the group are offset by one block in the respective planes.

In the remaining groups, the blocks are offset by two blocks in the respective planes. For example, due to the bad blocks 630 and 631, a next group 658 includes blocks 611 and 632, which are mapped to by consecutive LBAs of 16 and 17, respectively. A next group 659 includes blocks 612 and 633, which are mapped to by consecutive LBAs of 18 and 19, respectively. A next group 660 includes blocks 613 and 634, which are mapped to by consecutive LBAs of 20 and 21, respectively. A next group 661 includes blocks 614 and 635, which are mapped to by consecutive LBAs of 22 and 23, respectively. A next and last group 662 includes blocks 615 and 636, which are mapped to by consecutive LBAs of 24 and 25, respectively.

This approach maps pairs of consecutive LBAs to adjacent or nearly adjacent blocks in respective planes. This can be useful during testing, for example, where it is desirable to test blocks in a specific region of the planes. For example, programming and reading operations can be performed to determine an error count for a specific region of the planes. This approach can also be useful during normal operations, to ensure that the propagation times for signals to a pair of blocks in respective planes, such as the word line voltage signal, is equalized by ensuring that the pair of blocks are at the same or nearly same distance from the peripheral circuits. The technique can potentially allow shorted voltage transition times to increase performance.

In contrast, the process of FIG. 4A-4C could result in a pair of consecutive LBAs being mapped to highly non-adjacent blocks in the respective planes. For example, LBAs of 2 and 3 are mapped to blocks with PBAs of 2 and 13, where PBA=2 is for a block near the start of the sequence 400 and PBA=13 is for a block near the end of the sequence.

The groupings of FIG. 7 can be implemented by a circuit which is configured to receive a request to perform an operation, the request comprising a pair of consecutive logical block addresses (e.g., LBA=0 and 1), and in response to the request, perform the operation concurrently on a corresponding pair of good blocks (e.g., blocks 601 and 621) comprising a good block (e.g., block 601) from the first block sequence (e.g., sequence 600) and a good block (e.g., block 621) from the second block sequence (e.g., sequence 620).

Figure 8A:
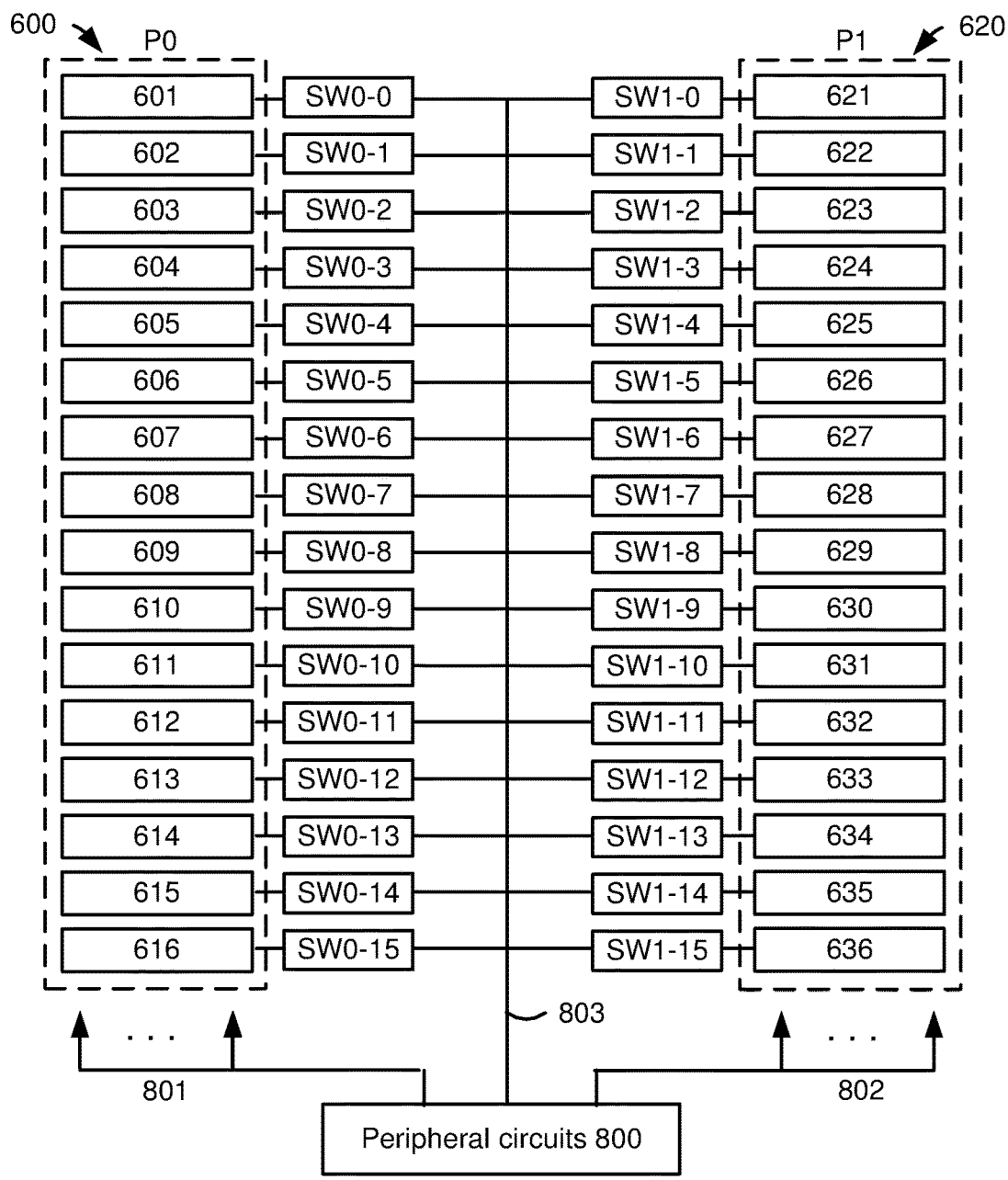
FIG. 8A depicts a circuit which routes signals to the pairs of blocks of the sequences 600 and 620 of FIG. 7.

FIG. 8A depicts a circuit which routes signals to the pairs of blocks of the sequences 600 and 620 of FIG. 7. The circuit includes the sequences 600 and 620 of blocks in planes P0 and P1, respectively. A switch is associated with each block for routing a block and word line select signal, and a word line voltage signal, from peripheral circuits 800 to one block in each plane via a path 803. The word line voltage signal can be routed to a group of blocks comprising adjacent or nearly adjacent blocks, as discussed in connection with FIG. 7. The peripheral circuits can include, e.g., the control circuitry 110, row decoder 124, read/write circuits 128 and column decoder 132 of FIG. 1. The peripheral circuits can be on the periphery of a die such as depicted in FIG. 2.

For example, switches SW0-0 to SW0-15 are associated with blocks 601-616, respectively, and switches SW1-0 to SW1-15 are associated with blocks 621-636, respectively. For instance, to provide a program or read voltage to the blocks 601 and 621 of the group 650, SW0-0 and SW1-0 are selected with block select signals and the remaining switches are unselected. During the operations on the blocks, the peripheral circuits provide appropriate bit lines voltages to the blocks via sets of bit lines 801 and 802. Each set of bit lines is shared by the blocks in a plane.

Figure 8B:
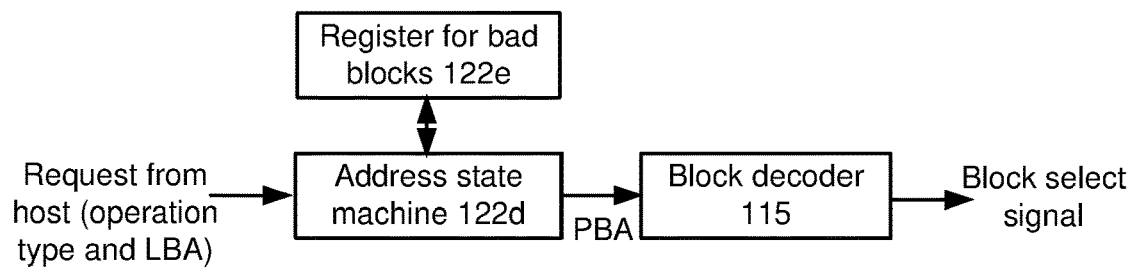
FIG. 8B depicts the register 122e, address state machine 122d and block decoder 115 of FIG. 1 providing PBAs and block select signals for use in the circuit of FIG. 8A.

FIG. 8B depicts the register 122e, address state machine 122d and block decoder 115 of FIG. 1 providing PBAs and block select signals for use in the circuit of FIG. 8A. The address state machine 122d receives a request from a host, for example, where the request identifies an operation type (e.g., program or read) and one or more LBAs of blocks on which the operation is to be performed. The address state machine accesses the register 122e to identify the bad blocks and determine a mapping from an LBA to a block. The address state machine can map LBAs to blocks such as by their PBA or other identifier or address. In one approach, the address state machine performs calculations based on the LBA and the number of bad blocks, such as discussed in connection with FIG. 9D.

The address state machine can output a PBA to which the input LBA is mapped, to the block decoder. The block decoder, in turn, outputs a block select signal based on the PBA. In some cases, a program or read request can identify additional information such as a word line.

Figure 9A:
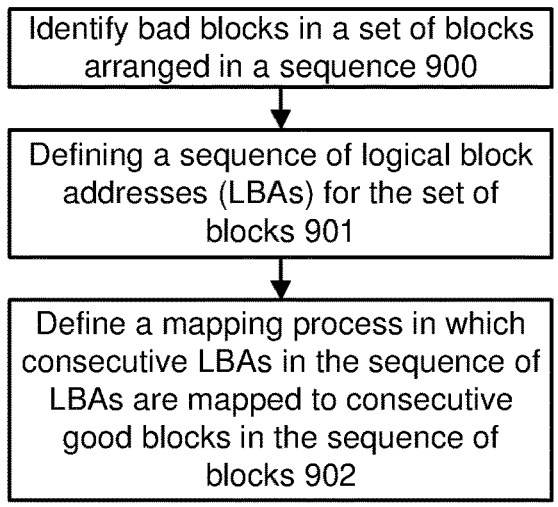
FIG. 9A depicts a process for defining a mapping process in which consecutive LBAs in a sequence of LBAs are mapped to consecutive good blocks in a sequence of blocks.

FIG. 9A depicts a process for defining a mapping process in which consecutive LBAs in a sequence of LBAs are mapped to consecutive good blocks in a sequence of blocks. Step 900 includes identifying bad blocks in a set of blocks arranged in a sequence. For example, this can involve writing data to a block and reading the data back. This can occur, e.g., in a test process at the time of manufacture. If there are uncorrectable errors, the block is declared a bad block. Step 901 includes defining a sequence of logical block addresses (LBAs) for the set of blocks. For example, the LBAs can range from 0 to 12 as in the example of FIG. 5A-5C. The LBAs can be conform to a file system at a host device. Step 902 includes defining a mapping process in which consecutive LBAs in the sequence of LBAs are mapped to consecutive good blocks in the sequence. An example process was described in connection with FIG. 5A-5C, for example. The address state machine 122d can be configured to perform the mapping process in one approach, using the processes of FIG. 9B-9D, for example.

Figure 9B:
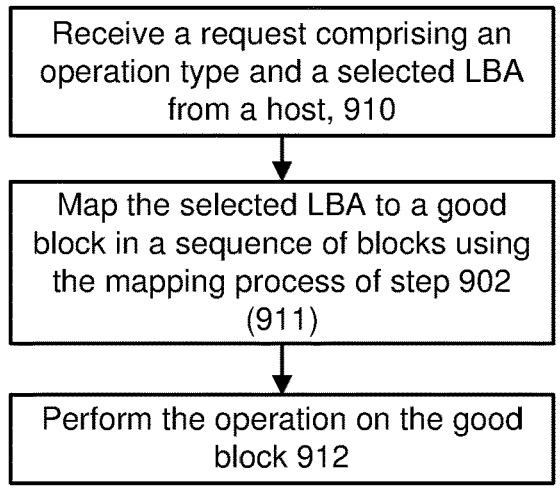
FIG. 9B depicts a process for handling a request to perform an operation on a block.

FIG. 9B depicts a process for handling a request to perform an operation on a block. The process can be performed by the components of FIG. 8B, for example. Step 910 includes receiving a request comprising an operation type and a selected LBA, such as from a host. A selected LBA is an LBA which is currently being processed to be mapped to a block. Step 911 includes mapping the selected LBA to a good block in a sequence of blocks using the mapping process of step 902 and FIG. 9D. Step 912 includes performing the operation on the good block. This is the selected block of the mapping process.

Figure 9C:
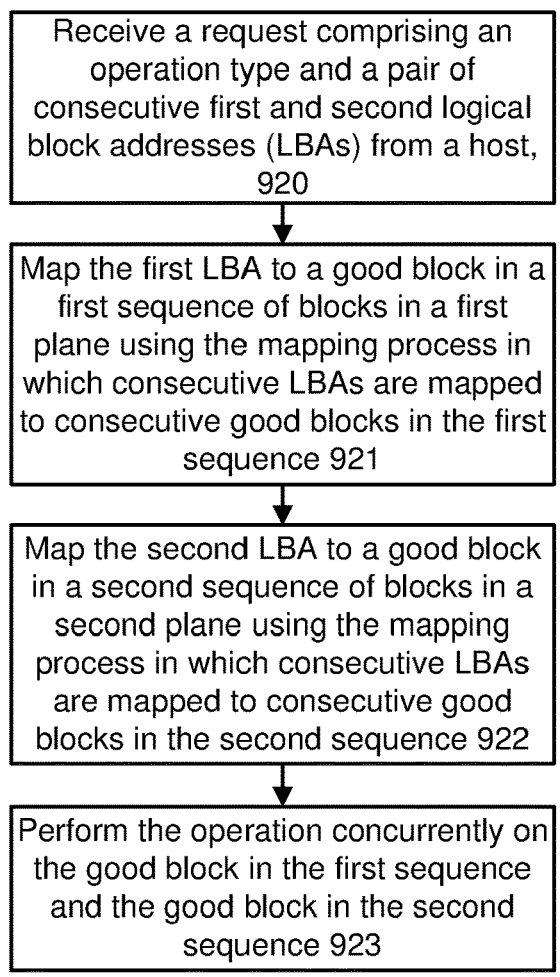
FIG. 9C depicts a process for processing a request to perform an operation on multiple blocks.

FIG. 9C depicts a process for processing a request to perform an operation on multiple blocks. A request can include multiple LBAs for performing an operation in parallel on multiple respective blocks in multiple respective planes. For example, the request could include a pair of LBAs, consistent with the example of FIG. 7. Step 920 includes receiving a request comprising an operation type and a pair of consecutive first and second logical block addresses (LBAs) from a host.

Step 921 includes mapping the first LBA to a good block in a first block sequence in a first plane using the mapping process in which consecutive LBAs are mapped to consecutive good blocks in the first block sequence. Step 922 includes mapping the second LBA to a good block in a second sequence of blocks in a second plane using the mapping process in which consecutive LBAs are mapped to consecutive good blocks in the second sequence. For example, in FIG. 7, the sequences 600 and 620 are the first and second sequences, respectively. The pair of consecutive first and second logical block addresses can be LBA=0 and LBA=1 in the group 650, for instance.

Step 923 includes performing the operation concurrently on the good block in the first block sequence and the good block in the second sequence. For example, for a program operation, the switches SW0-0 and SW1-0 of FIG. 8A can be controlled to route program voltages to the blocks 601 and 621, respectively. Respective word lines can be selected in these blocks as well.

Figure 9D:
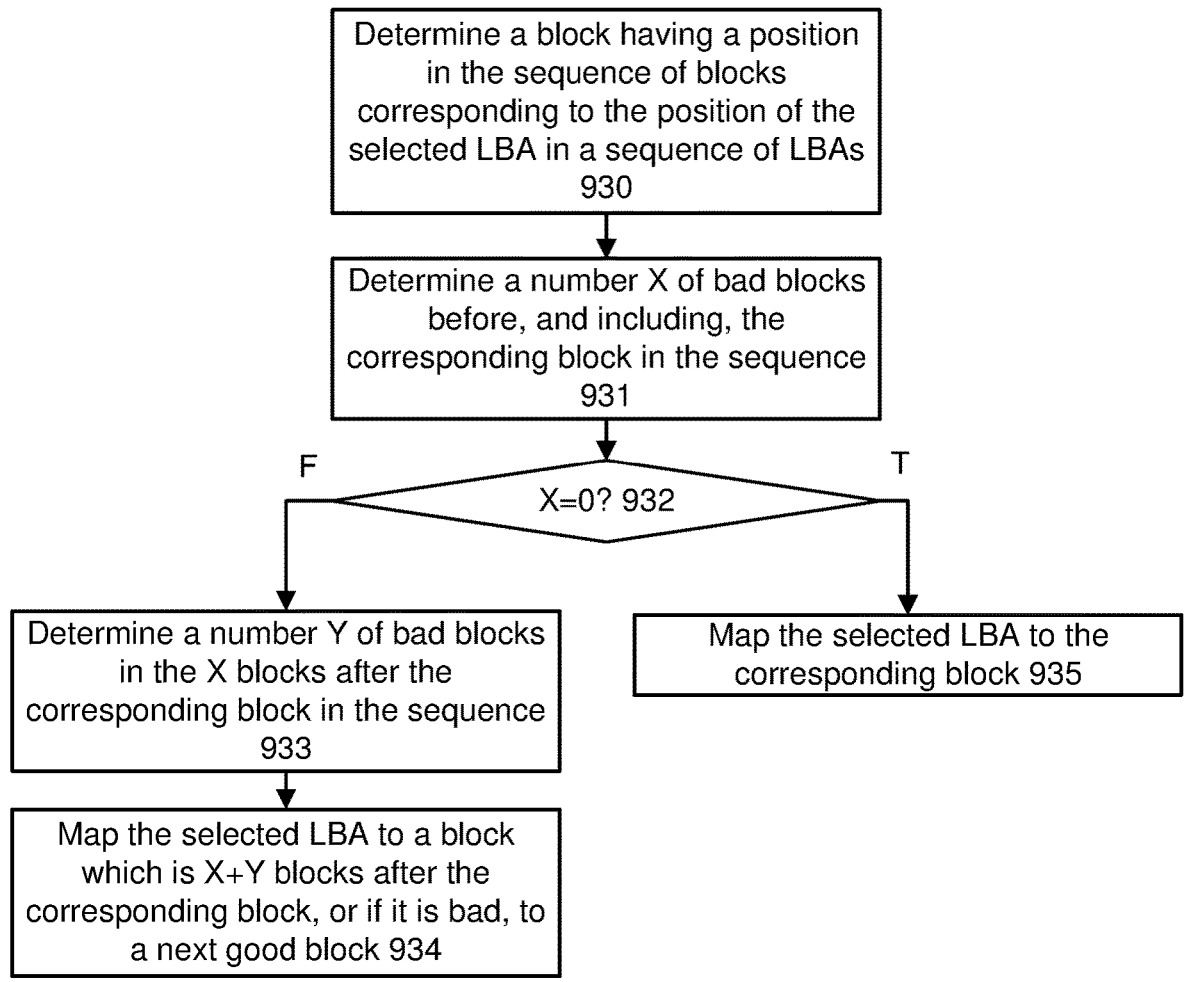
FIG. 9D depicts a process for performing step 911 of FIG. 9B.

FIG. 9D depicts a process for performing step 911 of FIG. 9B. The process can be performed by the address state machine, for example. Step 930 includes determining a block having a position in the sequence of blocks corresponding to the position of the selected LBA in a sequence of LBAs. Recall that each LBA in a set or sequence of LBAs has a respective position within the set or sequence, e.g., first, second and so forth. The position ranges from a first position to a last position. Similarly, each block in a set or sequence of blocks has a respective position within the set or sequence. Each PBA in a set or sequence of PBAs also has a respective position within the set or sequence. In the example of FIG. 5A, the LBAs are 0-15 and the PBA are 0-15. For LBA=5, for example, the corresponding block is block 406 having PBA=5.

In one approach, the address state machine or other circuit can be configured to determine the relative position of an LBA based on the LBA value. For example, in the single plane example of FIG. 5A, LBA=5, for instance, denotes the sixth LBA in the sequence of LBAs from 0-15. In the two plane example of FIG. 6A, where it is know that even-numbered LBAs are used for P0 and odd-numbered LBAs are used for P1, it is known that, e.g., LBA=5 denotes the third LBA in the odd-numbered sequence of LBAs from 1-31. In a three plane example of FIG. 11A, assuming one plane per die, it is know that LBAs of 0-15, 16-31 and 32-47 are used for Die 0, Die 1 and Die 2*a*, respectively. Therefore, it is known that, e.g., LBA=38 denotes the seventh LBA in Die 2*a*.

In this process, as the LBA is incremented, the LBA can be mapped to the corresponding PBA until a bad block is encountered in the sequence. Step 931 includes determining a number X of bad blocks before, and including, the corresponding block in the sequence. X is an integer of zero or more. For example, for the corresponding block 406 having PBA=5 in FIG. 5A, there is one bad block (block 404 with PBA=3) before the corresponding block, and block 406 is not a bad block, so that X=1. Block 404 is before block 406 because block 404 is closer than block 406 to the first block 401 in the sequence 400. The address state machine can determine X by reading the bad block register to determine a number of PBAs in the register which are lower than the PBA of the corresponding block of the selected LBA.

A decision step 932 determines if X=0. If the decision step is true, step 935 maps the selected LBA to the corresponding block. For example, in FIG. 5A, for block 403 with PBA=2, X=0, so that LBA=2 is mapped to PBA=2. That is, the second LBA in a sequence of LBAs is mapped to the second block in a sequence of blocks. If the decision step is false, step 933 determines a number Y of bad blocks in the X blocks after the corresponding block in the sequence. X and Y are integers of zero or more, and Y<=X. For example, when block 406 having PBA=5 in FIG. 5A is the corresponding block, and X=1, there are Y=0 bad blocks in the X=1 block (block 407 is a good block) after the corresponding block in the sequence. Step 934 includes mapping the selected LBA to a block which is X+Y blocks after the corresponding block, or if it is bad (e.g., the block which is X+Y blocks after the corresponding block is bad), to a next good block (after the block which is X+Y blocks after the corresponding block). For example, LBA=5 is mapped to a block which is 1+0=1 block after the corresponding block 406. That is, LBA=5 is mapped to a block 407 with PBA=6. This is consistent with FIG. 5C. Advantageously, the mapping can be performed using the bad block information and knowledge of the block to which the selected LBA corresponds.

The address state machine can determine Y by reading the bad block register to determine a number of PBAs in the register which are in the range of: PBA of the corresponding block+1 to a PBA of the corresponding block+X. For example, with PBA=5, and X=1, the address state machine reads the bad block register to determine a number of PBAs in the register which are between the PBA of 5+1=6 and 5+1=6. Y=0 in this example.

As another example, assume the selected LBA is LBA=9 and good block 410 is the corresponding block, in FIG. 5A. In this case, X=1 since block 404 is bad and block 410 is good, and Y=1 since block 411 is bad. LBA=9 is then mapped to block 412 with PBA=9+2=11. With PBA=9, and X=1, the address state machine reads the bad block register to determine a number of PBAs in the register which are in the range of: PBA of 9+1=10 to 9+1=10. Y=1 in this example.

As another example, assume the selected LBA is LBA=10 and bad block 411 is the corresponding block, in FIG. 5A. In this case, X=2 since blocks 404 and 411 are bad, and Y=0 since blocks 412 and 413 are good. LBA=10 is then mapped to block 413 with PBA=10+2=12. With PBA=10, and X=2, the address state machine reads the bad block register to determine a number of PBAs in the register which are in the range of: PBA of 10+1=11 to 10+2=12. Y=0 in this example.

As another example, in the sequence 620 of FIG. 6A, assume the selected LBA is LBA=17 and good block 629 is the corresponding block. In this case, X=1 since block 627 is bad, and Y=1 since block 630 is bad. With X+Y=2, LBA=17 could potentially be mapped to a block which is two blocks later, namely block 631 with PBA=21. However, block 631 is a bad block. Block 631 is the first block which is considered as a substitute for block 629 using the formula: block 629+X+Y=629+2 blocks=block 631. The next good block after block 631 is block 632 with PBA=23. This is the next good block which is available as a substitute for block 629. Block 632 is therefore selected as a substitute for block 629 and LBA=17 is mapped to block 632, consistent with FIG. 6D.

Note that the techniques of FIG. 9A-9D could be modified to include different groups of memory cells other than a block of memory cells. For example, an LBA could be mapped to a portion of a block such as half a block, in which case consecutive LBAs can be mapped to consecutive good half blocks. Or, an LBA could be mapped to a multiple blocks such as pairs of blocks, in which case consecutive LBAs can be mapped to pairs of consecutive good blocks.

Figure 10A:
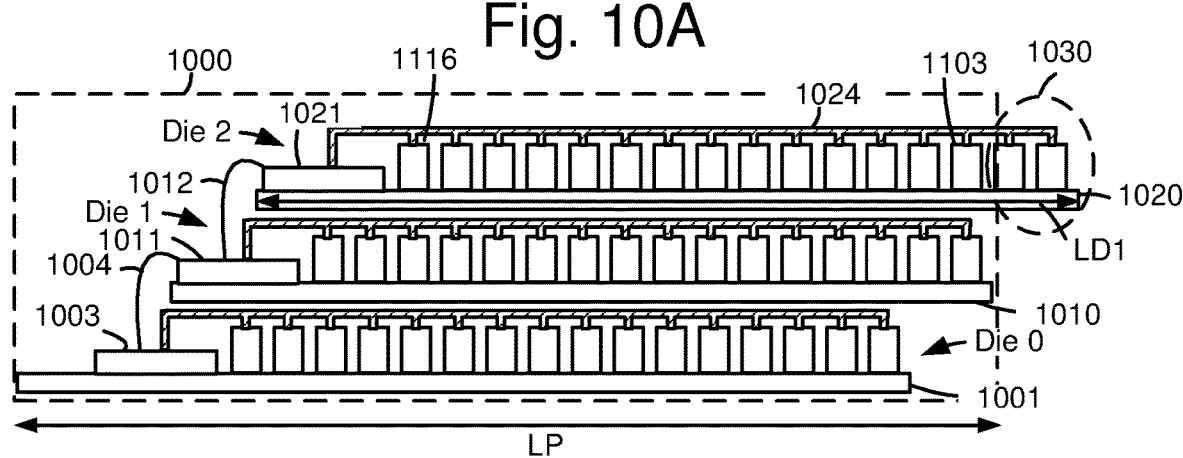
FIG. 10A depicts stacked memory die in a package 1000.

FIG. 10A depicts stacked memory die in a package 1000. Memory die can be stacked atop one another to provide a compact package with a high storage capacity. In this example, the package includes three die: Die 0 on the bottom, Die 1 at the second level and Die 2 at the top level. Each die includes a substrate 1001, 1010 or 1020, and on the substrate, peripheral circuits 1003, 1011 or 1021 and a set of blocks arranged in one or more sequences. For example, the top die includes blocks 1101, 1102 and 1103-1116. See also FIG. 10C. The peripheral circuits can be connected to one another by bond wires 1004, 1012 and 1021. Each die also include a set of bit lines extending over the respective blocks of the die. For example, the top die includes a set of bit lines 1024. In one approach, a common off-die controller is used to control each of the die.

The die are slightly offset from one another to provide room for the bond wires to be connected at the periphery of the die. As a result, the required length of the package becomes greater as the number of stacked dice (multiple die) increases. This is contrary to the goal of minimizing the package size. A solution involves trimming away a portion of the blocks on one or more of the die. In this example, a portion 1030 of the top die is trimmed away, such as by using laser cutting. The trimmed away portion may be at the side of the die which is opposite to the side at which the peripheral circuits are formed, so that the functioning of the peripheral circuits is not impaired. Cutting away one or more blocks at the end of the sequence of blocks, and cutting through the set of bit lines, allows the remaining blocks to function. The cutting can occur before the die is stacked.

Figure 10B:
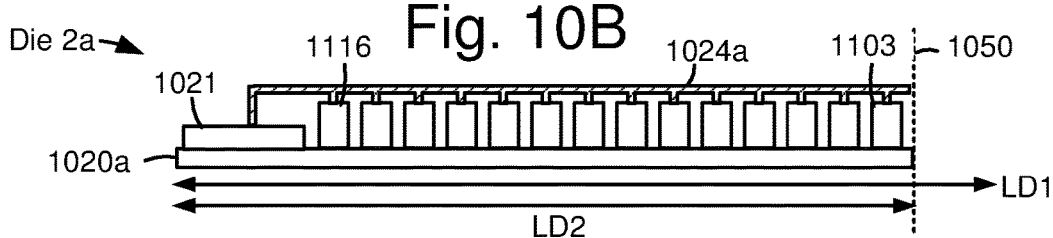
FIG. 10B depicts a trimmed die, Die 2a, formed by trimming Die 2 of FIG. 10A.

As a result, the top die can be trimmed to fit within a smaller package. For example, the length of the top die can be decreased from LD1 to LD2 (FIG. 10B). The portion of the die which is trimmed away has a length LD3, where LD1=LD2+LD3. This allows the three dice to fit within the length LP of the package. This may be an acceptable tradeoff for the loss of the storage capacity of the trimmed away blocks. Generally, one or more die can be trimmed.

FIG. 10B depicts a trimmed die, Die 2a, formed by trimming Die 2 of FIG. 10A. The trimming or cutting occurs at a line 1050, between blocks 1103 and 1102. A shortened substrate 1020a having a length LD2 is formed. A trimmed set of bit lines 1024a are connected to the blocks 1103-1116.

Figure 10C:
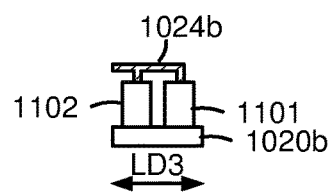
FIG. 10C depicts a trimmed away portion of the Die 2 of FIG. 10A.

FIG. 10C depicts a trimmed away portion of the Die 2 of FIG. 10A. A portion 1020b of the substrate is depicted, in addition to a portion 1024b of the set of bit lines, and the blocks 1101 and 1102. In this simplified example, two blocks out of sixteen are trimmed away, leaving fourteen blocks (blocks 1103-1116 in FIG. 10B) remaining. The trimmed away portion has a length LD3.

Note that the length in FIG. 10A-10C refers to a distance along the sequence of blocks. The sequence can be in a straight line.

Figure 10D:
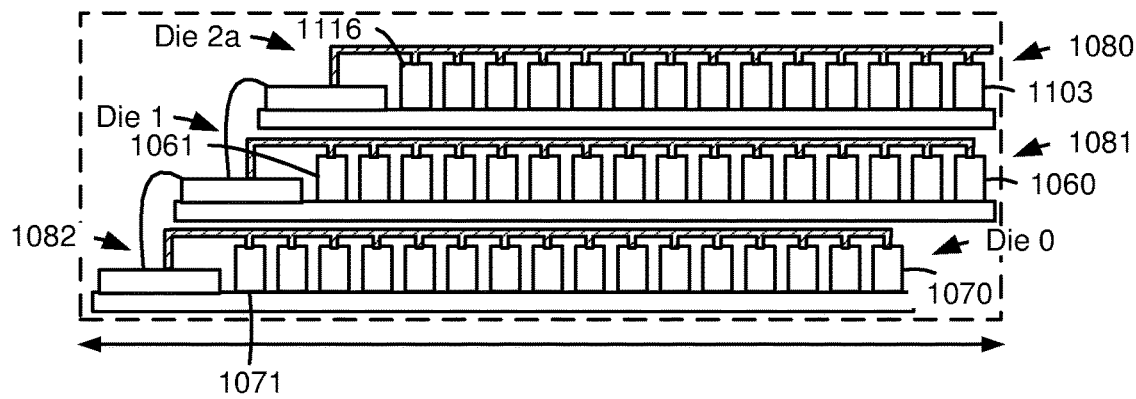
FIG. 10D depicts the stacked memory die package of FIG. 10A with the trimmed Die 2a of FIG. 10B replacing the Die 2.

FIG. 10D depicts the stacked memory die package of FIG. 10A with the trimmed Die 2a of FIG. 10B replacing the Die 2. Die 2a includes a sequence 1080 of blocks, starting at an initial block 1103 and ending at a last block 1116. Die 1 includes a sequence 1081 of blocks, starting at an initial block 1060 and ending at a last block 1061. Die 0 includes a sequence 1082 of blocks, starting at an initial block 1070 and ending at a last block 1071.

Bad blocks in the trimmed die, Die 2a, can be handled in a similar manner as with an untrimmed die, with adjustments to account for the trimmed away blocks. FIGS. 11A and 11B provide further details.

This approach can apply to various memory device form factors including Secure Digital (SD), micro SD and Compact Flash (CF).

FIG. 11A depicts the sequence 1080 of blocks in the trimmed die, Die 2a, of FIG. 10B, where consecutive logical block addresses are mapped to consecutive good blocks. The sequence 1080 includes the blocks 1103-1116 which correspond to logical addresses 34-47, respectively. The trimmed away blocks 1101 and 1102 correspond to logical addresses 32 and 33, respectively. In this example, the LBAs 0-15, 16-31 and 32-47 are reserved for use with sequences of blocks in Die 0, Die 1 and Die 2a, respectively.

Of the N=16 addresses reserved for the trimmed die, M addresses 1123 are used for the M blocks 1121 in the sequence 1080 and N-M addresses 1122 are used for the trimmed away blocks 1120. Further, the bad blocks are blocks 1107, 1110 and 1111 having PBA=38, 41 and 42, respectively. M and N are integers of one or more, where N>M.

FIG. 11B depicts a register for bad blocks, consistent with FIG. 11A. The register includes LBAs 1130 (e.g., LBA=32 and 33) for the trimmed away blocks, and LBAs 1131 (e.g., LBA=38, 41 and 42) for the remaining bad blocks. In one approach, a separate register of bad blocks is provided for each die. By including the LBAs which correspond to the trimmed away blocks in the bad block register, the address state machine can use the same process, e.g., as discussed in connection with FIG. 9D, to map consecutive LBAs to consecutive good blocks in a trimmed die as well as an untrimmed die. Also, the mapping can begin from a first LBA in a sequence of LBAs for an untrimmed die, rather than having to store data indicating how many blocks have been trimmed away, and shifting the first LBA higher.

For example, assume a selected LBA is LBA=32, the first LBA in a sequence of LBAs for a trimmed die. At FIG. 9D, step 930, block 1101 with PBA=32 is a block corresponding to LBA=32. At step 931, X=1 since block 1101 is registered as a bad block. At step 933, Y=1 since the one block after block 1101 (block 1102) is also registered as a bad block. At step 934, LBA=32 is mapped to block 1103 with PBA=34 since 32+2=34, and since block 1103 is a good block. Block 1103 is a next available good block for block 1101.

As another example, assume a selected LBA is LBA=33. At FIG. 9D, step 930, block 1102 with PBA=33 is a block corresponding to LBA=33. At step 931, X=2 since blocks 1101 and 1102 are bad blocks. At step 933, Y=0 bad blocks are in the two blocks after block 1102 (since blocks 1103 and 1104 are good). At step 934, LBA=33 is mapped to block 1104 with PBA=35 since 33+2=35, and since block 1104 is a good block. Block 1104 is a next available good block for block 1102.

As another example, assume a selected LBA is LBA=42. At FIG. 9D, step 930, block 1111 with PBA=42 is a block corresponding to LBA=42. At step 931, X=5 since blocks 1101, 1102, 1107, 1110 and 1111 are bad blocks. At step 933, Y=0 bad blocks are in the five blocks after block 1111 (e.g., blocks 1112-1116 are good). At step 934, LBA=42 is mapped to block 1116 with PBA=47 since 42+5+0=47, and since block 1116 is a good block. Block 1116 is a next available good block for block 1111.

FIG. 11C depicts a correspondence between LBAs and PBAs consistent with FIGS. 11A and 11B. LBA=32 to LBA=35 are mapped to PBA=34 to PBA=37, respectively. LBA=36 and LBA=37 are mapped to PBA=39 and PBA=40, respectively. LBA=38 to LBA=42 are mapped to PBA=43 to PBA=47, respectively.

The bad blocks 1101, 1102, 1107, 1110 and 1111 are substituted by the blocks 1103, 1104, 1112, 1115 and 1116, respectively, as shown by the associated curved arrows in FIG. 11A. These are examples of next available good blocks which substitute for the bad blocks.

Accordingly, it can be seen that, in one implementation, an apparatus comprises: a first set of blocks (401-416, 601-616, 621-636, 1103-1116, 1060-1061, 1070-1071) arranged in a first block sequence (400, 600, 620, 1080, 1081, 1082) in a first plane (P0, P1) on a substrate (201), each block in the first set of blocks comprising memory cells (303-314, 323-334, 343-354, 363-374); and a circuit (122) configured to map consecutive logical block addresses in a first sequence of logical block addresses (LBA0, LBA1, ... LBA15, LBA0, LBA2, ... LBA30, LBA1, LBA3, ... LBA31) to consecutive good blocks (401-403, 405-410, 412-416; 601-604, 606-608, 610-616; 621-626, 628, 629, 632-636; 1103-1106, 1108, 1109, 1112-1116) in the first block sequence, wherein for each bad block (404, 411; 605, 609; 627, 630, 631; 1101, 1102, 1107, 1110, 1111) of one or more bad blocks in the first block sequence, the mapping substitutes a next available good block (431, 437, 606, 611, 628, 633, 634, 1103, 1104, 1112, 1115, 1116) in the first block sequence.

The above-mentioned apparatus may also comprise: a second set of blocks (621-636) arranged in a second plane (P1) on the substrate in a second block sequence (620), each block in the second set of blocks comprising memory cells, wherein: the circuit is configured to map consecutive logical block addresses in a second sequence of logical block addresses to consecutive good blocks in the second block sequence, wherein for each bad block of one or more bad blocks in the second block sequence, the mapping substitutes a next available good block in the second block sequence; the first sequence of logical block addresses and the second sequence of logical block addresses extend in a range of logical block addresses; and each pair of consecutive logical block addresses in the range of logical block addresses comprises a logical block address from the first sequence of logical block addresses and a logical block address from the second sequence of logical block addresses, and is mapped to a pair of good blocks comprising a good block from the first block sequence and a good block from the second block sequence.

In another implementation, a method comprises: receiving a request to perform an operation, the request comprising a selected logical block address in a first sequence of logical block addresses (LBA0, LBA1, . . . LBA15, LBA0, LBA2, . . . LBA30, LBA1, LBA3, . . . LBA31); and selecting a good block (401-403, 405-410, 412-416; 601-604, 606-608, 610-616; 621-626, 628, 629, 632-636; 1103-1106, 1108, 1109, 1112-1116) in a sequence of blocks (400, 600, 620, 1080, 1081, 1082) according to a circuit (122) which maps consecutive logical block addresses in the first sequence of logical block addresses to consecutive good blocks in the sequence of blocks, such that each bad block (404, 411; 605, 609; 627, 630, 631; 1101, 1102, 1107, 1110, 1111) in the sequence is replaced by a next available good block (431, 437, 606, 611, 628, 633, 634, 1103, 1104, 1112, 1115, 1116) in the sequence.

In another implementation, an apparatus comprises: sets of blocks (401-416, 601-616, 621-636, 1103-1116, 1060-1061, 1070-1071) arranged in stacked dice (Die 0, Die 1, Die 2*a*), wherein the blocks comprise memory cells (303-314, 323-334, 343-354, 363-374), the stacked dice comprise a trimmed die (Die 2*a*) having a number M blocks in a sequence and an untrimmed die (Die 0, Die 1) having a number N blocks, where a number M physical block addresses are associated with the M blocks, a number N-M physical block addresses are associated with N-M trimmed away blocks of the trimmed die, and M<N; a register (122*e*) configured to store physical block addresses of bad blocks among the M blocks of the trimmed die, and to store the N-M physical block addresses associated with the trimmed away blocks of the trimmed die; and means (122*d*), responsive to the register, for mapping a first sequence of consecutive logical block addresses (LBA0, LBA1, . . . LBA15, LBA0, LBA2, . . . LBA30, LBA1, LBA3, . . . LBA31) to consecutive good blocks among the M blocks of the trimmed die.

The means for mapping described above can include the components of the memory device 100 of FIG. 1 and FIG. 8B, for example, such as the controller 122 and its components and the control circuitry 110. The address state machine 122*d*, for instance, may include circuits and firmware for mapping a first sequence of consecutive logical block addresses to consecutive good blocks among the M blocks of a trimmed die.

Additionally, the apparatus can include means, responsive to a register, for mapping a second sequence of consecutive logical block addresses to consecutive good blocks among the N blocks of the untrimmed die. This means for mapping can also include the components of the memory device 100 of FIG. 1 and FIG. 8B, for example.

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:
1. An apparatus, comprising:
a first set of blocks arranged in a first block sequence in a first plane on a substrate, each block in the first set of blocks comprising memory cells; and
a circuit configured to map consecutive logical block addresses in a first sequence of logical block addresses to consecutive good blocks in the first block sequence; wherein for each bad block of one or more bad blocks in the first block sequence, the mapping substitutes a next available good block in the first block sequence; wherein:
the first set of blocks is arranged in a trimmed die which is among stacked dice, the stacked dice comprise an untrimmed die, the trimmed die having a number M blocks, and the untrimmed die having number N blocks, where M<N; and
the circuit comprises a bad block register which identifies N-M trimmed physical blocks of the trimmed die as bad blocks.
2. The apparatus of claim 1, wherein:
the circuit is configured to perform the mapping of the consecutive logical block addresses in the first sequence of logical block addresses, starting from a first logical block address in the first sequence of logical block addresses and continuing to a last logical block address in the first sequence of logical block addresses, to consecutive good blocks in the first block sequence, starting from an initial good block in the first block sequence and continuing to a last good block in the first block sequence which is used in the mapping of the consecutive logical block addresses in the first sequence.
3. The apparatus of claim 1, further comprising:
a second set of blocks arranged in a second plane on the substrate in a second block sequence, each block in the second set of blocks comprising memory cells, wherein:
the circuit is configured to map consecutive logical block addresses in a second sequence of logical block addresses to consecutive good blocks in the second block sequence, wherein for each bad block of one or more bad blocks in the second block sequence, the mapping substitutes a next available good block in the second block sequence;
the first sequence of logical block addresses and the second sequence of logical block addresses extend in a range of logical block addresses; and
each pair of consecutive logical block addresses in the range of logical block addresses comprises a logical block address from the first sequence of logical block addresses and a logical block address from the second sequence of logical block addresses, and is mapped to a pair of good blocks comprising a good block from the first block sequence and a good block from the second block sequence.

4. The apparatus of claim 3, wherein:
the circuit is configured to receive a request to perform an operation, the request comprising a pair of consecutive logical block addresses, and in response to the request, perform the operation concurrently on a corresponding pair of good blocks comprising a good block from the first block sequence and a good block from the second block sequence.

5. The apparatus of claim 1, wherein:
for each bad block of the one or more bad blocks in the first block sequence, the next available good block in the first block sequence comprises a good block which is not a substitute for another bad block.

6. The apparatus of claim 1, wherein:
a position of each logical block address in the first sequence of logical block addresses corresponds to a position of a block in the first block sequence; and
to map a selected logical block address in the first sequence of logical block addresses to a block in the first block sequence, the circuit is configured to:
determine a block having a position in the first block sequence corresponding to the position of the selected logical block address in the first sequence of logical block addresses;
determine a number X>1 of bad blocks before, and including, the corresponding block in the sequence;
determine a number Y of bad blocks in the X blocks after the corresponding block in the sequence; and
map the selected logical block address to a block which is X+Y blocks after the corresponding block in the first block sequence, or, if the block which is X+Y blocks after the corresponding block is a bad block, to a next good block alter the block which is X+Y blocks after the corresponding block.

7. The apparatus of claim 1, wherein:
a position of each logical block address in the first sequence block addresses corresponds to a position of a block in the first block sequence; and
to map a selected logical block address in the first sequence of logical block addresses to a block in the first block sequence, the circuit is configured to:
determine a block having a position in the first block sequence corresponding to the position of the selected logical block address in the first sequence of logical block addresses;
determine whether the corresponding block is a bad block and whether there are any bad blocks before the corresponding block in the sequence; and
map the selected logical block address to the corresponding block if the corresponding block is not a bad block and there are no bad blocks before the corresponding block in the sequence.

8. The apparatus of claim 1, wherein:
the circuit comprises a register and an address state machine connected to the register; the register is configured to store addresses of one or more bad blocks in the first block sequence; and
the address state machine is configured to perform the mapping to substitute a next available good block in the first block sequence for each bad block identified by the register.

9. A method, comprising:
receiving a request to perform an operation, the request comprising a selected logical block address in a first sequence of logical block addresses; and
selecting a good block in a sequence of blocks according to a circuit which maps consecutive logical block addresses in the first sequence of logical block addresses to consecutive good blocks in the sequence of blocks, such that each bad block in the sequence is replaced by a next available good block in the sequence; wherein:
the sequence of blocks is arranged in a trimmed die which is among stacked dice;
the stacked dice comprise an untrimmed die;
the trimmed die comprises a number M blocks;
the untrimmed die comprises a number N blocks, where N>M; and
the circuit comprises a register which identifies N-M trimmed physical blocks of the trimmed die as bad blocks.

10. The method of claim 9, wherein:
a position of each logical block address in the first sequence of logical block addresses corresponds to a position of a block in the sequence; and
the selecting of the of the good block comprises:
determining a block having a position in the sequence corresponding to the position of the selected logical block address in the first sequence of logical block addresses;
determine a number X>1 of bad blocks before, and including, the corresponding block in the sequence;
determine a number Y of bad blocks in the X blocks after the corresponding block in the sequence; and
mapping the selected logical block address to a block which is X+Y blocks after the corresponding block in the sequence, or, if the block which is X+Y blocks after the corresponding block is a bad block, to a next good block after the block which is X+Y blocks after the corresponding block.

11. The method of claim 9, wherein:
the circuit maps consecutive logical block addresses in the first sequence of logical block addresses, starting from a first logical block address in the first sequence of logical block addresses and continuing to a last logical block address in the first sequence of logical block addresses, to consecutive good blocks in the sequence, starting from an initial good block in the sequence and continuing to a last good block in the sequence which is used in the mapping.

12. The method of claim 9, wherein:
each next available good block in the sequence comprises a good block which is not a substitute for another bad block.

13. The method of claim 9, wherein:
the register also identifies one or more bad blocks among the M blocks.

14. An apparatus, comprising:
sets of blocks arranged in stacked dice, wherein the blocks comprise memory cells, the stacked dice comprise a trimmed die having a number M blocks in a sequence and an untrimmed die having a number N blocks, where a number M physical block addresses are associated with the M blocks, a number N−M physical block addresses are associated with N−M trimmed away blocks of the trimmed die, and M<N;

a register configured to store physical block addresses of bad blocks among the M blocks of the trimmed die, and to store the N–M physical block addresses associated with the trimmed away blocks of the trimmed die; and means, responsive to the register, for mapping a first sequence of consecutive logical block addresses to consecutive good blocks among the M blocks of the trimmed die.

15. The apparatus of claim 14, wherein:

a number N physical block addresses are associated with the N blocks of the untrimmed die; and the registers configured to store physical block addresses of bad blocks among the N blocks of the untrimmed die, the apparatus further comprising:

means, responsive to the register, for mapping a second sequence of consecutive logical block addresses to consecutive good blocks among the N blocks of the untrimmed die.

16. The apparatus of claim 14, wherein:

the first sequence of consecutive logical block addresses extends from a first logical block address in the first sequence of logical block addresses to a last logical block address in the first sequence of logical block addresses; and the consecutive good blocks extend from a first good block of the M blocks of the trimmed die to a last good block of the M blocks of the trimmed die which is used in the mapping.

17. The apparatus of claim 14, wherein:

for each bad block in the M blocks of the trimmed die, the means for mapping substitutes a next available good block in the sequence.

18. The apparatus of claim 17, wherein:

the next available good block in the sequence comprises a good block which is not a substitute for another bad block.

* * * * *